United States Patent Office 2,726,140
Patented Dec. 6, 1955

2,726,140

PRODUCTION OF CHLORINE AND METAL SULFATES

Ralph Miller, Pleasantville, N. Y., assignor to The Chemical Foundation, Incorporated, a New York membership corporation No Drawing. Application February 24, 1954,
Serial No. 412,366

5 Claims. (Cl. 23—87)

This invention is concerned with the production of chlorine and metal sulfates and more particularly with the production of chlorine from metallic chlorides that form sulfates which are amenable to separation from manganous chloride or manganous nitrate. Included in the chlorides which fall into this class are sodium chloride, potassium chloride and calcium chloride.

This invention is also concerned with the recovery of manganese concentrates from manganese dioxide-containing source materials.

Much time and effort have been spent in an attempt to economically convert salt and sulfur into sodium sulfate and chlorine since the need for chlorine is outstripping the need for caustic soda. This need is evidenced by the paper entitled "Wanted—chlorine without caustic" which appeared in the May 1953 issue of "Chemical Engineering" starting at page 187. This problem is of long standing, since it has been studied for more than fifteen years. The outstanding process in this field is that of Hixson and Miller, U. S. Patent 2,441,550. The present inventor was a coinventor of U. S. Patent 2,441,550 and is familiar with the advantages and disadvantages of the type of process described in the above mentioned patent. The disadvantages, to date, have outweighed the advantages and no means have been devised as yet to overcome these disadvantages.

The fertilizer industry has need for a process for converting potassium chloride to potassium sulfate since some crops, such as tobacco, are adversely affected by chlorides in excess amounts. One method of making potassium sulfate is to react potassium chloride with sulfuric acid to form potassium sulfate and hydrochloric acid. This process has a number of limitations including the necessity of marketing the hydrochloric acid at a relatively good price in order to keep the cost of the potassium sulfate at a reasonable figure. This hydrochloric acid is in competition with by-product hydrochloric acid formed in large volume as a result of the chlorination of organic compounds. As the volume of by-product hydrochloric acid increases, the difficulty of disposing at a favorable price of the hydrochloric acid made from potassium chloride will increase. Hence, it will be advantageous to produce potassium sulfate and chlorine from potassium chloride and sulfur.

The first cost of a plant to produce electrolytic chlorine and caustic soda is exceedingly high. A plant producing 100 tons of chlorine a day along with 112 tons of caustic will cost in excess of ten million dollars. Hence, one of the difficulties of the chlorine industry is the production of chlorine by a process which does not require an exorbitant capital investment and which can operate at a profit without the necessity of selling a coproduct that produces more revenue than the chlorine. Obviously, a process of this sort must have an inexpensive source of the initial chloride. Under some circumstances this source can be calcium chloride since calcium chloride solutions constitute a waste disposal problem of the ammonia soda process.

The foregoing facts are well known to the art. Because the demands on a process which makes chlorine in competition with the highly developed electrolytic chlorine art are many, no suitable process has been found to date. The present invention is able to fulfill the requirements of a process to supplement, not replace, the electrolytic production of chlorine. The novel combination of interrelated operations that constitutes this invention has for its primary objectives:

To produce chlorine and metallic sulfates, as specified above, from the appropriate chloride and a sulfur dioxide-containing gas.

No diminution in yield because water is present during any of the steps of the process.

The formation of chlorine in the absence of noncondensible gases.

The avoidance of converting the sulfur dioxide to sulfuric acid or sulfur trioxide.

The use of the oxygen in the air as the fundamental oxidant without the necessity for separating it from the nitrogen.

A fundamental objective of this invention is the ability to use any economical source of sulfur since any sulfur dioxide-containing gas stream can be employed. There is no fundamental necessity for keeping the sulfur dioxide concentration within prescribed limits.

An additional objective of this invention is the economical recovery of metallurgical grade manganese concentrates from manganese dioxide source materials. The United States steel industry is almost wholly dependent upon imported manganese ores for the production of ferromanganese although there are large deposits of low grade manganese ores within the United States. No economical process for securing metallurgical grade manganese concentrates has been devised to date. Because these ores are so lean and so complex it is questionable whether any hydrometallurgical process can be found that will be economical. However, by producing these concentrates as a coproduct along with other commodities, it is economically feasible to produce manganese concentrates by using this invention.

Other advantages of this invention will be clear from the description below.

This process accomplishes its primary objectives by using nitric acid and manganese dioxide as cyclic reagents, and, in essence, uses manganese dioxide to oxidize the chloride to chlorine and the sulfur dioxide to sulfate. In each case, obviously, it is reduced. The oxygen in the air is then used to convert the manganese back to manganese dioxide. The function of the nitric acid is to aid the manganese dioxide convert the chloride to chlorine and to simplify the oxidation of the manganese to the dioxide by the oxygen of the air.

The conversion of sodium chloride and sulfur to chlorine and sodium sulfate is made up of the following principal steps.

Solid manganese dioxide is dispersed in a sodium chloride solution. The sodium chloride is present in approximately 25% concentration. This concentration is not essential but is helpful in that it permits a technically feasible operation and aids in describing the invention. The dispersion is maintained at a temperature of about 35° C. and an excess of solid manganese dioxide is always present. The dispersion is then contacted with a sulfur dioxide-containing gas. The slurry is contacted with the sulfur dioxide-containing gas until the concentration of manganous sulfate is about half the equivalent concentration of the sodium chloride. The reaction which takes place may be written:

$$SO_2 + MnO_2 = MnSO_4$$

It is preferable to avoid the formation of polythionates. This can be done by keeping the temperature of the dispersion up, maintaining the slurry slightly acid and always having an excess of manganese dioxide present. The pH of the solution should be about 1 and not be permitted to exceed 4.

The dispersion is then filtered, centrifuged or settled to separate the solid manganese dioxide. The resulting solution is then cooled, preferably by feeding the solution to a vacuum crystallizer. The cooling is carried to between about 5 to 10° C. Under these conditions most of the sodium and sulfate crystallize out as sodium sulfate decahydrate $Na_2SO_4 \cdot 10H_2O$. The manganous chloride remains in solution since it is very soluble both in hot and cold water. In addition, the manganous chloride in solution depresses the solubility of sodium sulfate thereby increasing the yield. It is not essential that all of the sodium sulfate come out of solution but it is helpful to have as little stay in solution as possible.

The reaction which takes place on cooling may be written:

$$XH_2O + 2NaCl + MnSO_4 = MnCl_2 + Na_2SO_4 \cdot 10H_2O + (X-10)H_2O$$

The solid hydrated sodium sulfate is filtered off and may be recrystallized to purify it and to minimize the loss of manganese. The hydrated sodium sulfate is then dehydrated using any of the known processes.

The filtrate containing manganous chloride is then preferably concentrated in a multiple effect evaporator to form a solution containing not less than about 50% manganous chloride. Any solids that come out of solution may be separated and recycled to the sulfur dioxide contacting step. It is desirable to concentrate the manganous chloride to the maximum extent possible in preparation for the next step of the process since, as will be seen, all of the water associated with the manganous chloride must eventually be vaporized.

The manganous chloride either as a concentrated solution, solid hydrated manganous chloride or a slurry of solid hydrated manganous chloride dispersed in a concentrated manganous chloride solution is then fed to the chlorine formation step of the process.

In the chlorine formation step of the process the manganous chloride is reacted with nitric acid and manganese dioxide. The reaction is preferably carried out at a temperature of about 135° C. or so in the presence of an excess of solid manganese dioxide. The nitric acid is fed to the reaction in the form of a 50% solution or at an elevated temperature in the gaseous phase. The manganese dioxide is added to the reaction in the form of a concentrated slurry composed of solid manganese dioxide dispersed in a concentrated solution of manganous nitrate. The chlorine formation reaction may be written:

$$MnCl_2 + MnO_2 + 4HNO_3 = Cl_2 + 2H_2O + 2Mn(NO_3)_2$$

At the elevated temperature chlorine and water vapor are evolved.

A concentrated solution of manganous nitrate is the other product of the reaction.

The concentrated solution of manganous nitrate is reacted at an elevated temperature with an excess of air under such conditions that there is always a relatively high partial pressure of water vapor and the non-volatile manganese oxide that remains is formed in an attenuated condition so that a large surface is exposed to the air. Under these conditions and within a temperature range of about 180–240° C., most of the manganous nitrate reacts to form manganese dioxide and nitric acid:

$$Mn(NO_3)_2 + H_2O + \tfrac{1}{2}O_2(air) = 2HNO_3 + MnO_2$$

The nitric acid is evolved as a vapor along with the excess air and the nitrogen. The gas from the thermal reaction is led into a scrubber type condenser from which nitric acid of about 50% concentration is recovered. To recover any oxides of nitrogen that may have been inadvertently formed, the exit gases from the condenser may be scrubbed with an aqueous slurry of manganese dioxide. The nitric acid is recycled to the chlorine formation step of the process. Half of the manganese dioxide is also recycled to the chlorine formation step of the process. The other half is recycled to the sulfur dioxide gas containing step of the process.

It is clear from the foregoing that the solution leaving the chlorine formation step of the process will be substantially free from chloride but will contain all the sodium and sulfate that accompanied the reactants. Neither the sodium nor the sulfate is affected by the thermal reaction and hence these substances will be in the manganese dioxide residue. Since half of the manganese dioxide is recycled to the sulfur dioxide contacting step of the process, eventually all of the sodium and sulfate that flow into the chlorine formation zone of the process is recycled. Because some sodium passes through the entire cycle some sodium nitrate will be present in the manganese dioxide. This small quantity of nitrate will pass through the sulfur dioxide contacting step, the sodium sulfate crystallizing step and eventually back into the chlorine formation step, since sodium and manganous nitrate are both much more soluble at low temperatures than sodium sulfate. Because of these fortuitous findings, it is not essential that the manganous chloride be free from sodium sulfate prior to its introduction into the chlorine formation step.

A suitable method of carrying out the process on an industrial scale comprises burning sulfur with compressed air to form a sulfur dioxide-containing gas. The hot sulfur dioxide-containing gas is cooled in a waste heat boiler and steam is secured as a by-product of this step of the process. The sulfur dioxide-containing gas is contacted in an absorption tower with a sodium chloride solution in which solid manganese dioxide is dispersed. The tower internals contain a grid work of wooden slats to break up the downcoming dispersion thereby exposing the gas to a large surface of absorbent, thus facilitating the absorption of the sulfur dioxide. The pH of the solution can be controlled by the addition of either nitric acid or chlorine.

The solution is separated from the excess manganese dioxide by filtration or the like. The filtrate is then pumped into a vacuum crystallizer installation equipped with a steam jet ejector. The vacuum causes some water to flash off, thereby lowering the temperature and causing some hydrated sodium sulfate to crystallize out. Due to the boiling point rise of the manganous chloride solution it may be necessary to supplement this cooling with mechanical refrigeration. This is indicated where steam costs tend to be high and electric power tends to be low.

The resulting slurry of solid, hydrated sodium sulfate is preferably centrifuged to separate the solution from the solids. The cake can be washed in the centrifuge or the cake redissolved and recrystallized, taking advantage of the steep temperature solubility curve of sodium sulfate to purify it. A conventional method of dehyrating decahydrated sodium sulfate consists of melting it in its own water of crystallization, evaporating much of the water by submerged combustion to form a slurry of solid anhydrous sodium sulfate in a hot solution of sodium sulfate, separating the solid from most of the mother liquor by settling and then drying the separated crystals in a direct fired kiln.

The manganous chloride solution resulting from the separation of the solid sodium sulfate is then concentrated in a multiple effect vacuum evaporator. It is preferable to concentrate the manganous chloride to the point where a slurry is formed containing about 30% of solid dihydrated manganous chloride dispersed in a solution containing about 53.5% of manganous chloride. Under these conditions the concentration of manganous chloride in the feed to the chlorine formation step is about 70%.

The chlorine formation step of the process is preferably carried out in a brick lined reactor equipped with a small dephlegmator and some corrosion resistant heat transfer surfaces. The heat of the chlorine formation reaction is small but heat must be supplied to vaporize the chlorine and to drive off the excess water, since it is desirable to have the manganous nitrate solution leave the reactor at a temperature of about 135° C. The feed to the chlorine formation step consists of manganous chloride, manganese dioxide and nitric acid. The manganous chloride is preferably pumped into the reactor as a concentrated slurry. The manganese dioxide is pumped into the reactor in the form of a slurry dispersed in manganous nitrate. The nitric acid may be pumped in as a solution but it is simpler to feed the reaction with nitric acid as a hot vapor. This simplifies the heat input to the reactor to a substantial extent. In addition, it permits a high concentration of nitric acid vapor to contact the manganous nitrate solution that is about to leave the reactor. This will cause any small amount of chloride that may be present to be vaporized and oxidized. In this way the chloride content of the manganous nitrate solution leaving the reactor is minimized.

The hot nitric acid vapor fed to the reactor may be supplied by vaporizing the nitric acid in a stainless steel heat exchanger using high pressure steam. To further increase the heat input to the reactor the nitric acid vapors may be superheated in a direct fired furnace.

The vapor leaving the reactor through the dephlegmator consists of steam and chlorine. The gas is cooled to condense the steam. The wet chlorine gas is then dehydrated in the usual manner with sulfuric acid prior to cooling and liquefaction.

The concentrated manganous nitrate solution that flows out of the chlorine formation reactor is then thermally reacted with water and oxygen in the air to form manganese dioxide and nitric acid. One method by which this reaction can be successfully carried out consists of continuously feeding a thin film of manganous nitrate solution to an internally heated revolving drum reactor. The drum is encased in a housing connected to a stainless steel condenser. Air is passed over the drum. As the film of manganous nitrate revolves, it is heated. This causes water to evaporate and the manganous nitrate to react. In the presence of air and steam, nitric acid vapor is formed and solid manganese dioxide forms on the drum. The heat input to the drum and the speed of rotation is so regulated that the reaction is substantially completed by the time the drum has completed its rotation. A strategically placed knife blade scrapes off the thin film of manganese dioxide adhering to the drum so that the heat transfer to the succeeding film of manganous nitrate solution will not be impaired. The gas leaving the drum reactor passes through the condenser and the nitric acid is condensed. After passing through the condenser the gas may conveniently be scrubbed with a slurry of manganese dioxide to recover any small quantity of oxides of nitrogen that were formed inadvertently.

The above method of carrying out the reaction of manganous nitrate with air and water is limited in that it is not readily feasible to build units that will produce more than twenty to thirty tons of manganese dioxide a day. Hence, multiple units are needed to obtain larger capacities.

This limitation is overcome by carrying out the reaction in a radically different fashion. A fluidized bed of manganese dioxide is established in a reactor. The bed is sufficiently large so that it completely covers an extended area of heat transfer surface in the form of tubing. Hot products of combustion are passed through the tubing to supply heat to the reaction. Excess air is preheated and supplied to the bed to keep it fluidized. The temperature of the bed is maintained in the range 180–240° C. A concentrated solution of manganous nitrate is sprayed into the fluidized bed. The conditions within the reaction zone comply with the requirements for carrying out the desired reaction. The manganous nitrate is reacted in an attenuated form so that air is in the vicinity of the reacting solid. A controlled, steam atmosphere is formed by the vaporisation of the water in which the manganous nitrate is dissolved. Fluidized beds are characterized by ease of temperature control and substantial uniformity of temperature within the bed. The heat transfer to the nitrate solution is rapid. By keeping the temperature of the bed within the designated temperature range, the manganous nitrate never reaches the metallic heat transfer surface. The only material that reaches the heating surface is the finely divided manganese dioxide. In this way heat is imparted to the manganous nitrate solution using manganese dioxide as the heat transfer medium, and the manganese dioxide that forms has no opportunity for forming an adherent, insulating film on the heat transfer surface.

The gas leaving the reactor is made to pass through an internal cyclone or a metallic gas filter so that excessive quantities of manganese dioxide will not accompany the nitric acid. Any entrained particles that reach the condenser are washed out by the condensed nitric acid and returned to the chlorine formation reactor.

The manganese dioxide which is formed in the fluidized bed reactor or on the drum reactor is recycled half to the sulfur dioxide contacting step and the other half to the chlorine formation step.

When potassium chloride is used instead of sodium chloride the process is simplified to some degree. Since potassium sulfate is less soluble at elevated temperatures than sodium sulfate, it is feasible to simply form a concentrated solution of manganous sulfate in the sulfur dioxide contacting step, remove the excess manganese dioxide, and react the sulfate solution with a concentrated solution of potassium chloride. Potassium sulfate precipitates at room temperature. By cooling the solution to about 5° C. and additional quantity of potassium sulfate precipitates as the anhydrous salt, so it need only be separated from the manganous chloride washed free of adhering salts, and dried to be ready for sale. The concentration of the manganous chloride solution causes an additional amount of potassium sulfate to precipitate. This may be separated from the manganous chloride solution if desired. As is the case with sodium sulfate, it is not essential that all the potassium sulfate be removed from the manganous chloride solution, since it eventually finds its way out of the process when the manganese dioxide is recycled to the sulfur dioxide contacting step of the process.

When calcium chloride is used as the source of the chloride the process is simplified still more. A manganous sulfate solution is formed as described. This solution is reacted with a solution of calcium chloride which causes substantially all of the sulfate to be precipitated as hydrated gypsum. By carrying out the process at elevated temperatures anhydrite can be precipitated. In either case substantial separation of the calcium sulfate is readily achieved. The calcium sulfate is separated, the manganous chloride solution concentrated and the concentrated solution fed to the chlorine formation step of the process. The remaining steps of the process are similar to those when sodium chloride is used.

If manganous nitrate is heated in the absence of air or in a manner that does not permit the air to reach the reacting solid, then manganese dioxide and nitrogen dioxide are formed.

$$Mn(NO_3)_2 = MnO_2 + 2NO_2$$

The recovery of nitrogen dioxide as nitric acid necessitates a very expensive plant. For this reason the amount of nitrogen dioxide that is formed should be kept to a minimum and preferably should be well under 15% of the nitrate that is reacted.

Alternatively the metallic chlorides may be reacted with nitric acid and manganese dioxide to form chlorine and a mixture of the metallic nitrate and manganous nitrate. This solution may then be reacted with manganous sulfate; the metallic sulfate separated from the manganous nitrate by fractional crystallization and the resulting manganous nitrate converted to nitric acid and manganese dioxide in the manner previously described.

This invention permits the economical recovery of manganese concentrates from manganese dioxide-containing raw materials by substituting either wholly or partially manganese dioxide-containing ore for the manganese dioxide formed from manganous nitrate in the sulfur dioxide-containing gas contacting step of the process. A suitable way to carry out the process when manganese concentrates are recovered from manganese ores consists of grinding the ore, dispersing it in an aqueous medium and pumping the slurry through a series of towers countercurrent to a sulfur dioxide containing gas. Most of the manganese dioxide goes into solution along with some of the other acid soluble constituents of the ore such as iron, aluminum, sodium, potassium, zinc, copper and the like. The resulting sulfate solution is separated from the insoluble gangue by settling and filtration. The filtrate may then be purified in part by raising the pH to between 5 and 6. This can be done in any convenient way including the use of manganous oxide formed by reducing manganese dioxide, the addition of lime or of caustic soda. Raising the pH causes most of the iron and aluminum to precipitate. These substances constitute most of the dissolved impurities. If necessary other reagents can be used to further purify the solution. The purified manganous sulfate is then reacted in solution with an appropriate chloride such as sodium chloride, potassium chloride or calcium chloride. If calcium chloride is used most of the calcium precipitates as the sulfate without any additional manipulation. If potassium or sodium chloride is used then fractional crystallization is employed to separate the alkali sulfate from the manganous chloride. By these devices a solution of manganous chloride is formed which is then converted to manganese dioxide and chlorine as described above.

Since some of the manganese dioxide is removed from the cycle and since it may be admixed with sulfates or nitrates, the oxide leaving the cycle is washed with water prior to final nodulizing. The wash water is either added to the cycle or thrown away depending on the amount and kind of soluble salts it has dissolved.

It should be evident that when this combination process is employed, the only costs properly chargeable to manganese recovery in addition to the cost of the ore is the cost of the ore preparation, a part of the cost of the leaching step, the cost of the filtration step, the cost of purifying the solution, the cost of disposing of the tails, possibly the cost of concentrating the purified manganous sulfate solution and the cost of the final nodulizing operation.

I claim:

1. The process which comprises reacting manganese dioxide with sulfur dioxide in an aqueous medium to form manganous sulfate, reacting the manganous sulfate with a metallic chloride selected from the group consisting of sodium chloride, potassium chloride, and calcium chloride, to form manganous chloride and the metallic sulfate, separating the metallic sulfate from the manganous chloride, reacting the separated manganous chloride with nitric acid and manganese dioxide to form chlorine and manganous nitrate, reacting the manganous nitrate with air and water at a temperature in the range 180–240° C. to form manganese dioxide and nitric acid, recycling an amount of manganese dioxide to the sulfur dioxide reaction step equimolar to the amount of metallic sulfate separated and the remainder of the manganese dioxide and all the nitric acid to the chlorine formation step.

2. The process which comprises reacting sulfur dioxide with a manganese dioxide-containing ore in an aqueous medium to form a slurry of a manganous sulfate solution in which the insoluble constituents of the ore are dispersed, separating the solution from the solids, reacting the manganese sulfate with a metallic chloride selected from the group consisting of sodium chloride, potassium chloride, calcium chloride to form manganous chloride and the metallic sulfate, separating the metallic sulfate from the manganous chloride, reacting the manganous chloride, with nitric acid and manganese dioxide to form chlorine and manganous nitrate, reacting the manganous nitrate with air and water in the temperature range of about 180–240° C. to form nitric acid and manganese dioxide and recycling the nitric acid and an amount of the manganese dioxide equimolar to the chlorine formed to the chlorine formation step.

3. The process of reacting a metallic chloride selected from the group consisting of sodium chloride, potassium chloride and calcium chloride, with nitric acid and manganese dioxide to form a metallic nitrate corresponding to the metallic chloride employed, manganous nitrate and chlorine, separating the chlorine from the mixed nitrates, reacting the separated metal nitrate with manganous sulfate, formed by reacting manganese dioxide with sulfur dioxide, to form manganous nitrate and the metallic sulfate, separating the metallic sulfate from the manganous nitrate, thermally reacting the manganous nitrate with air and water at a temperature within the range of about 180–240° C. to form nitric acid and manganese dioxide recycling a portion of the manganese dioxide to the manganous sulfate formation step equivalent to the amount of metallic sulfate separated and recycling the nitric acid and the balance of the manganese dioxide to the chlorine formation step.

4. A process in accordance with claim 1 in which the reaction of the manganous nitrate in the presence of air and water to form nitric acid and manganese dioxide is carried out by spraying a concentrated solution of manganous nitrate into a dense phase fluidized bed of manganese dioxide maintained at a temperature of between about 180° C. and 240° C.

5. A process in accordance with claim 2 in which the reaction of the manganous nitrate in the presence of water and air to form nitric acid and manganese dioxide is carried out by spraying a concentrated solution of manganous nitrate into a dense phase fluidized bed of manganese dioxide maintained at a temperature of about 200° C.

References Cited in the file of this patent
UNITED STATES PATENTS

| | | |
|---|---|---|
| 427,467 | Dormer | May 6, 1890 |
| 495,462 | Just | Apr. 11, 1893 |

FOREIGN PATENTS

| | | |
|---|---|---|
| 5,225 | Great Britain | 1889 |